(12) United States Patent
Ishimori

(10) Patent No.: US 6,874,305 B2
(45) Date of Patent: Apr. 5, 2005

(54) LAWN MOWER HAVING SELECTIVELY DRIVABLE WHEELS

(75) Inventor: Shoso Ishimori, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 10/233,337

(22) Filed: Aug. 30, 2002

(65) Prior Publication Data

US 2003/0106296 A1 Jun. 12, 2003

(30) Foreign Application Priority Data

Dec. 7, 2001 (JP) ......................................... 2001-373848

(51) Int. Cl.⁷ .............................................. A01D 69/00
(52) U.S. Cl. ......................................... 56/10.8; 180/6.2
(58) Field of Search ................................ 56/10.3, 10.8, 56/11.1, 11.3, 11.7, 11.8, 10.2 R, 10.2 G, DIG. 6; 180/6.2, 6.24, 6.26, 6.32, 6.34, 6.36, 337

(56) References Cited

U.S. PATENT DOCUMENTS

| | | | | |
|---|---|---|---|---|
| 4,669,559 A | * | 6/1987 | Fukui ........................ | 180/6.24 |
| 4,733,743 A | | 3/1988 | Weiss et al. | |
| 4,738,327 A | * | 4/1988 | Takei ........................ | 180/68.1 |
| 4,887,686 A | * | 12/1989 | Takei et al. ................ | 180/211 |
| 4,958,698 A | * | 9/1990 | Kirschner .................. | 180/408 |
| 5,065,835 A | * | 11/1991 | Richter et al. ............. | 180/197 |
| 5,090,512 A | * | 2/1992 | Mullet et al. .............. | 180/236 |
| 5,279,384 A | * | 1/1994 | Shibahata et al. .......... | 180/248 |
| 5,341,893 A | | 8/1994 | Fukui et al. | |
| 6,038,840 A | * | 3/2000 | Ishimori et al. ............ | 56/13.3 |
| 6,185,920 B1 | * | 2/2001 | Oxley ........................ | 56/14.7 |
| 6,493,624 B2 | * | 12/2002 | Nishida et al. ............ | 701/89 |

FOREIGN PATENT DOCUMENTS

| | | | |
|---|---|---|---|
| GB | 2335716 | 9/1999 | |
| JP | 401293234 A | * 11/1989 | ................ 475/231 |
| JP | 1997-220946 | 8/1997 | |
| JP | 2001-88731 | 4/2001 | |
| JP | 2001-278102 | 10/2001 | |

* cited by examiner

Primary Examiner—Robert E. Pezzuto
Assistant Examiner—Alicia Torres
(74) Attorney, Agent, or Firm—Webb Ziesenheim Logsdon Orkin & Hanson, P.C.

(57) ABSTRACT

A lawn mower having selectively drivable wheels, includes dirigible front drive wheels, a pair of right and left rear drive wheels, a body frame, an engine supported by the body frame, a mower unit vertically movably supported by the body frame forwardly of the rear drive wheels, a change speed device for changing a speed of drive from the engine, a front wheel driving device for transmitting drive from the change speed device to the front wheels, a left rear wheel driving device for transmitting drive from the change speed device to a right axle of the left rear wheel, a right rear wheel driving device for transmitting drive from the change speed device to a left axle of the left rear wheel, and rear wheel clutches associated with the left rear wheel driving device and the right rear wheel driving device, respectively, for selectively connecting and disconnecting drive. The rear wheel clutches are operable by an interlocking mechanism in response to a displacement to the front drive wheels from a straight running posture, to disconnect drive transmission to one of the rear drive wheels moving along an inner track of turning of the vehicle body. The interlocking mechanism has a link mechanism operatively connecting a steering mechanism for steering the front drive wheels to each of the rear wheel clutches, and extending over the mower unit.

8 Claims, 8 Drawing Sheets

LAWN MOWER HAVING SELECTIVELY DRIVABLE WHEELS

BACKGROUND OF THE INVENTION

1. Field of the Invention

This invention relates to a lawn mower having selectively drivable wheels.

2. Description of the Related Art

A conventional lawn mower has freely rotatable dirigible front wheels, and rear drive wheels. A rear wheel differential mechanism is disposed on a drive transmission line from the engine to the rear wheels. When making a turn, the right and left rear drive wheels are driven at different speeds. Another type of lawn mower has dirigible front drive wheels, and rear drive wheels. A front wheel differential mechanism is disposed on a drive transmission line from the engine to the front wheels, while a rear wheel differential mechanism is disposed on a drive transmission line from the engine to the rear wheels. When making a turn, the right and left front and rear drive wheels are driven at different speeds through the two differential mechanisms.

A differential mechanism can absorb a difference in rotation between right and left wheels occurring in time of making a turn, and is thus used as an indispensable component of an automobile or the like. However, where drive is transmitted to drive wheels through a differential mechanism, a difference in rotation between the right and left drive wheels is caused also by loads applied from the ground to the drive wheels in certain surface conditions. As a result, the vehicle will lose its straight running performance. This problem is serious for a lawn mower that runs on lawns or meadows in bad ground conditions, compared with an automobile that runs on paved roads. Further, when a sudden decrease occurs in the load applied from a lawn to one of the rear drive wheels, that rear drive wheel suddenly slips and rotates fast, thereby marring the lawn.

Thus, a conventional tractor has, instead of using a differential mechanism, a one-way clutch mechanism in each of the drive transmission lines to right and left drive wheels. The drive wheels are switchable by action of the one-way clutch mechanisms. Such a tractor is know from British Patent Publication GB2335716 or U.S. Pat. No. 4,733,743, for example. The known tractor achieves a smooth turning performance, without a differential mechanism, by breaking drive transmission to a rear drive wheel rotating excessively as it moves along an outer turning track. However, even a slight difference in rotation between the right and left rear wheels causes operation of a clutch mechanism. This reduces durability of the clutch mechanisms, and noise produced by the clutch mechanisms is far from negligible.

Further, a rice planting machine must move with a high straight running performance and sharp turning performance in a paddy field in very difficult surface conditions. The rice planting machine employs a technique of providing a clutch in each of drive transmission lines to right and left rear drive wheels, for breaking drive transmission to one of the rear drive wheels moving along an inner track when the machine makes a turn. Such rice planting machines are disclosed in Japanese Patent Publications (Unexamined) Nos. 2001-88731 and 1997-220946, for example.

A different type of rice planting machine is known from Japanese Patent Publication (Unexamined) No. 2001-278102. This rice planting machine has a differential mechanism mounted on a drive transmission line to right and left rear drive wheels, and clutches for the rear drive wheels. In time of making a turn, the differential mechanism is locked, and drive transmission to one of the rear drive wheels moving along an inner track is broken.

A rice planting machine is a special vehicle that runs in a rice field. Its body is relatively simple, and has a space under a body frame. It is therefore relatively easy to provide a control mechanism such as clutches for the right and left rear wheels.

On the other hand, a lawn mower needs a large mower unit vertically movably suspended under a body frame. It is difficult to provide a control mechanism for switching drive wheels. Thus, no mechanism has been employed for operating clutches for right and left rear wheels in response to steering of dirigible wheels.

SUMMARY OF THE INVENTION

The object of this invention is to provide a lawn mower having wheels selectively drivable in response to a steering operation, to achieve an excellent straight running performance and to be capable of smooth turning without marring ground surfaces.

The above object is fulfilled, according to this invention, by a lawn mower having selectively drivable wheels, comprising dirigible front drive wheels, a pair of right and left rear drive wheels, a body frame, an engine supported by the body frame, a mower unit vertically movably supported by the body frame forwardly of the rear drive wheels, a change speed device for changing a speed of drive from the engine, a front wheel driving device for transmitting drive from the change speed device to the front wheels, a left rear wheel driving device for transmitting drive from the change speed device to a right axle of the left rear wheel, a right rear wheel driving device for transmitting drive from the change speed device to a left axle of the right rear wheel, rear wheel clutches associated with the left rear wheel driving device and the right rear wheel driving device, respectively, for selectively connecting and disconnecting drive, and an interlocking mechanism for operating the rear wheel clutches in response to a displacement to the front drive wheels from a straight running posture, to disconnect drive transmission to one of the rear drive wheels moving along an inner track of turning of the vehicle body, the interlocking mechanism having a link mechanism operatively connecting a steering mechanism for steering the front drive wheels to each of the rear wheel clutches, and extending over the mower unit.

The interlocking mechanism is provided to disengage the rear wheel clutch corresponding to the rear drive wheel moving along an inner track of turning of the lawn mower in response to a displacement of the front drive wheels from the straight running posture to a steering posture. As a result, the lawn mower makes a turn by driving only the outward rear drive wheel, with the inward rear drive wheel in free rotation. This causes the outward rear drive wheel to rotate reliably and steadily while achieving a smooth turn. The question of space may be settled by providing a link mechanism operatively connecting the steering mechanism for steering the front drive wheels to each of the rear wheel clutches, and extending over the mower unit.

In time of straight running, the right and left clutches are both engaged and the right and left rear drive wheels are, so to speak, directly connected to each other through the drive transmitting line. Thus, a steady straight running state may be maintained even in bad surface conditions. The lawn mower according to this invention has an excellent straight running performance, and yet is capable of smooth turns with little chance of marring a ground surface.

Where the rear wheel clutches are friction clutches, drive transmission to the rear drive wheels may be connected and disconnected smoothly. This will also reduce noise generated in time of clutch operation.

Where the lawn mower has a grass catcher disposed in a rear position of the body frame, and a grass collecting duct for transmitting grass clippings cut by the mower unit rearward to the grass catcher, the grass collecting duct may be disposed to pass between the right axle and the left axle. The change speed device may be disposed laterally of the grass collecting duct between the right axle and the left axle. This arrangement clears up the question of space with ease.

The invention provides also a lawn mower having dirigible front non-drive wheels, and a pair of right and left rear drive wheels. Then, the lawn mower may advantageously comprise a rear wheel differential mechanism with a differential lock function, rear wheel clutches for selectively connecting and disconnecting drive to the respective rear wheels, and an interlocking mechanism for operating the rear wheel differential mechanism and the rear wheel clutches in response to a displacement to the front wheels from a straight running posture. To realize an excellent straight running performance and a turning performance with little chance of marring a ground surface, the interlocking mechanism operates the rear wheel differential mechanism and the rear wheel clutches such that, when the front wheels are at a small steering angle, the rear wheel differential mechanism is unlocked and the rear wheel clutches are both engaged, and when the front wheels are at a large steering angle, the rear wheel differential mechanism is locked and one of the rear wheel clutches associated with one of the rear drive wheels moving along an inner track of turning of the vehicle body is disengaged.

In another aspect of the invention, a lawn mower has dirigible front drive wheels for receiving drive through a front wheel differential mechanism, and a pair of right and left rear drive wheels for receiving drive through a rear wheel center clutch and respective rear wheel clutches. Then, the interlocking mechanism may operate the rear wheel center clutch and the rear wheel clutches such that, when the front wheels are at a small steering angle, the rear wheel center clutch is disengaged, and when the front wheels are at a large steering angle, the rear wheel center clutch is engaged and one of the rear wheel clutches associated with one of the rear drive wheels moving along an inner track of turning of the vehicle body is disengaged.

In a further aspect of the invention, a lawn mower has dirigible front drive wheels for receiving drive through a front wheel differential mechanism, and a pair of right and left rear drive wheels for receiving drive through a rear wheel differential mechanism with a differential lock function and respective rear wheel clutches. Then, the interlocking mechanism may operate the front wheel center clutch, the rear wheel differential mechanism and the rear wheel clutches such that, when the front wheels are at a small steering angle, the front wheel center clutch is disengaged, the rear wheel differential mechanism is unlocked and the rear wheel clutches are both engaged, and when the front wheels are at a large steering angle, the front wheel center clutch is engaged, the rear wheel differential mechanism is locked and one of the rear wheel clutches associated with one of the rear drive wheels moving along an inner track of turning of the vehicle body is disengaged.

Other features and advantages of this invention will be apparent from the following description of the embodiments to be taken with reference to the drawings.

DESCRIPTION OF THE PREFERRED EMBODIMENTS

Figure 1:
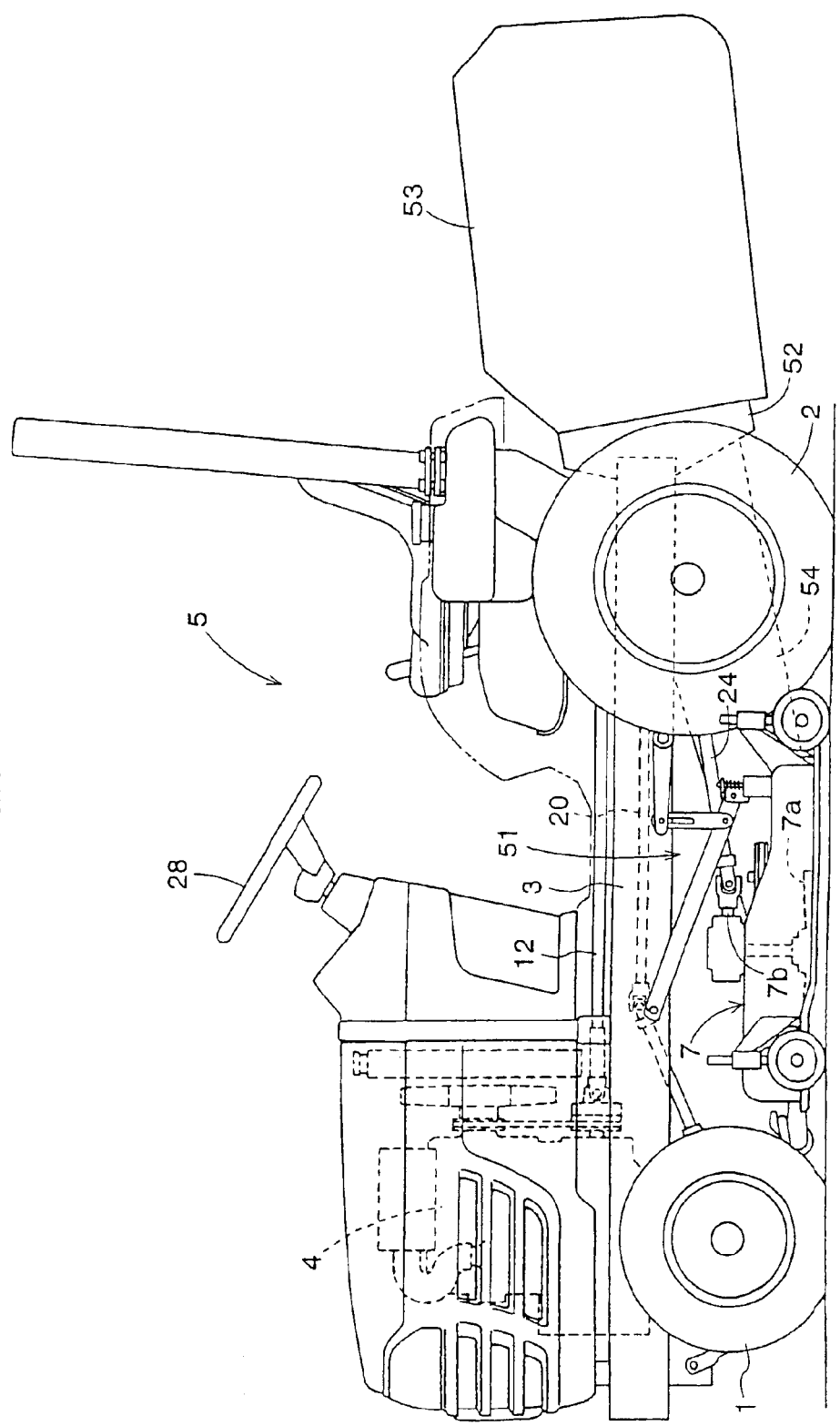
FIG. 1 is a side elevation of a lawn mower in a first embodiment of this invention.
Figure 2:
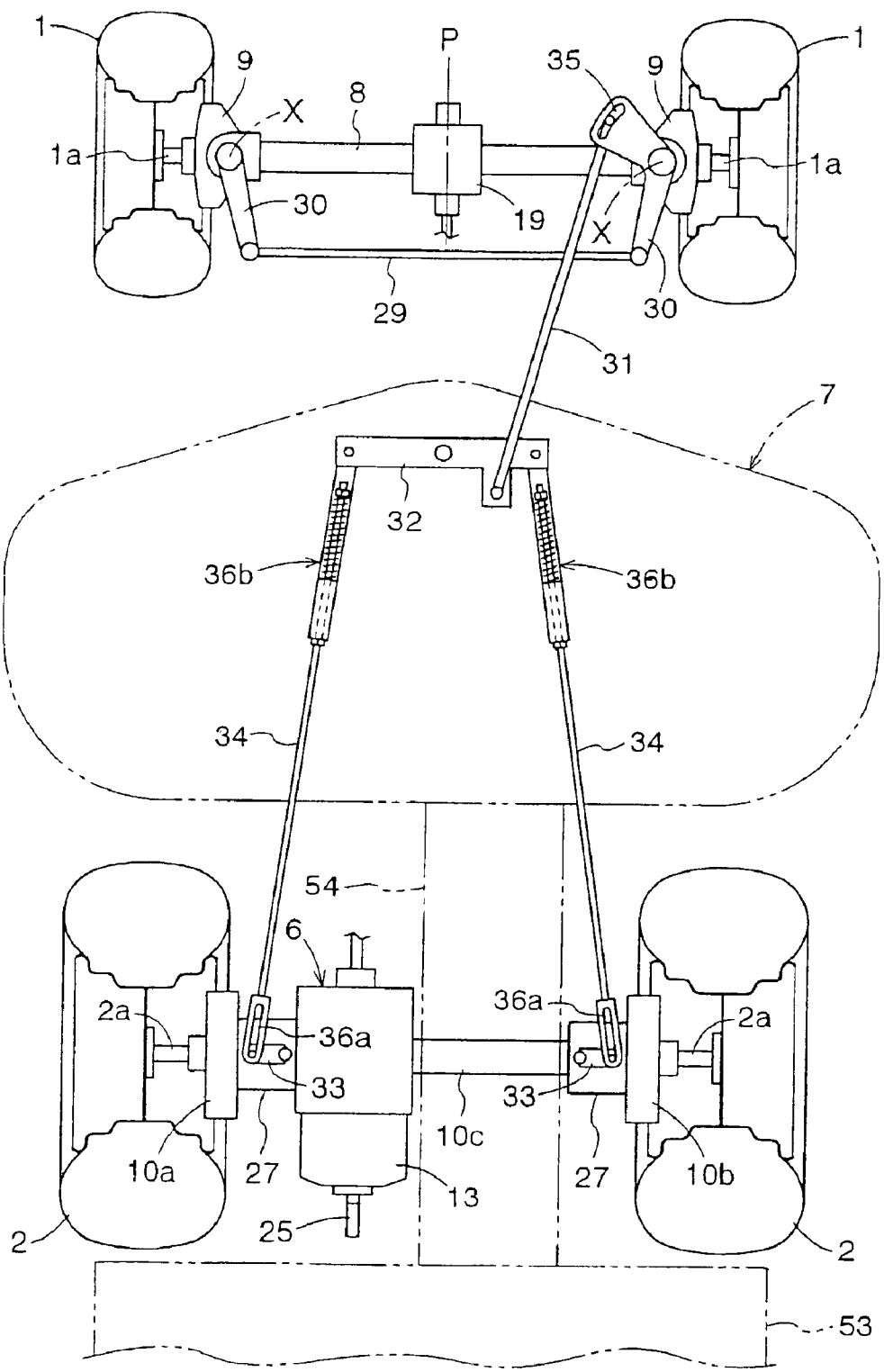
FIG. 2 is a schematic plan view showing a link mechanism in a straight running state of the lawn mower shown in FIG. 1.
Figure 3:
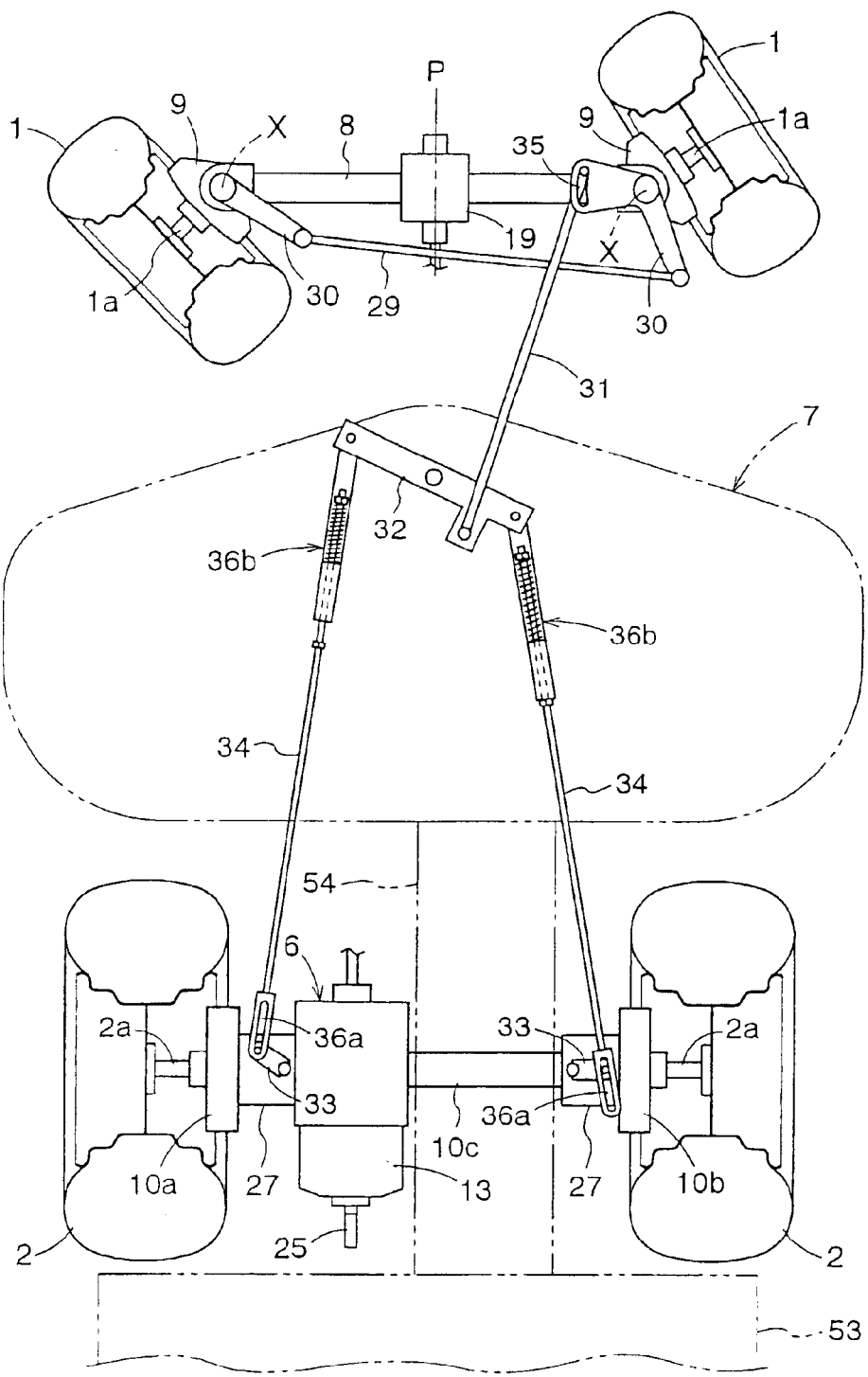
FIG. 3 is a schematic plan view showing the link mechanism in a turning state of the lawn mower shown in FIG. 1.

As shown in FIGS. 1 through 3, a lawn mower according to this invention has a pair of right and left dirigible front drive wheels 1 and a pair of right and left rear drive wheels 2 supporting a body frame 3. An engine 4 is mounted on a front portion of the body frame 3, and a driving platform 5 is formed on an upper rear portion of the body frame 3. Below the driving platform 5 is a transmission case 6 housing a change speed device including a gear transmission mechanism 6a and a stepless transmission 13 (which is an HST here). A mower unit 7 is vertically movably attached to the body frame 3 through a lift mechanism 51 in a space between the front drive wheels 1 and rear drive wheels 2. The mower unit 7 is the rear discharge type having a plurality of blades 7a juxtaposed transversely of the body frame 3 for cutting grass and rearwardly discharging grass clippings. In this embodiment, a grass catcher 53 is attached to the rear end of the body frame 3 through a bracket 52. A grass clippings outlet formed in a rear position of the mower unit 7 is connected to an opening formed in a front plane of the grass catcher 53 by a grass collecting duct 54 extending through a space between the right and left rear wheels 2. Thus, grass clippings cut by the mower unit 7 are transmitted to the grass catcher 53 through the grass collecting duct 54.

As shown in FIGS. 2 and 3, a transversely extending cylindrical transmission case 8 is supported by the body frame 3 to be capable of rolling about a fore and aft axis P. A vertical transmission case 9 is supported at each of opposite right and left ends of the transverse transmission case 8 to be pivotable about a kingpin axis X. A front axle 1a of the front drive wheel 1 is supported in a lower end region of each vertical transmission case 9. The transverse transmission case 8 has a front wheel differential mechanism 19 for the front drive wheels 1. The transverse transmission case 8 and right and left vertical transmission cases 9 contain transmission mechanisms from the front wheel differential mechanism 19 to the front axles 1a of the front drive wheels 1.

Figure 4:
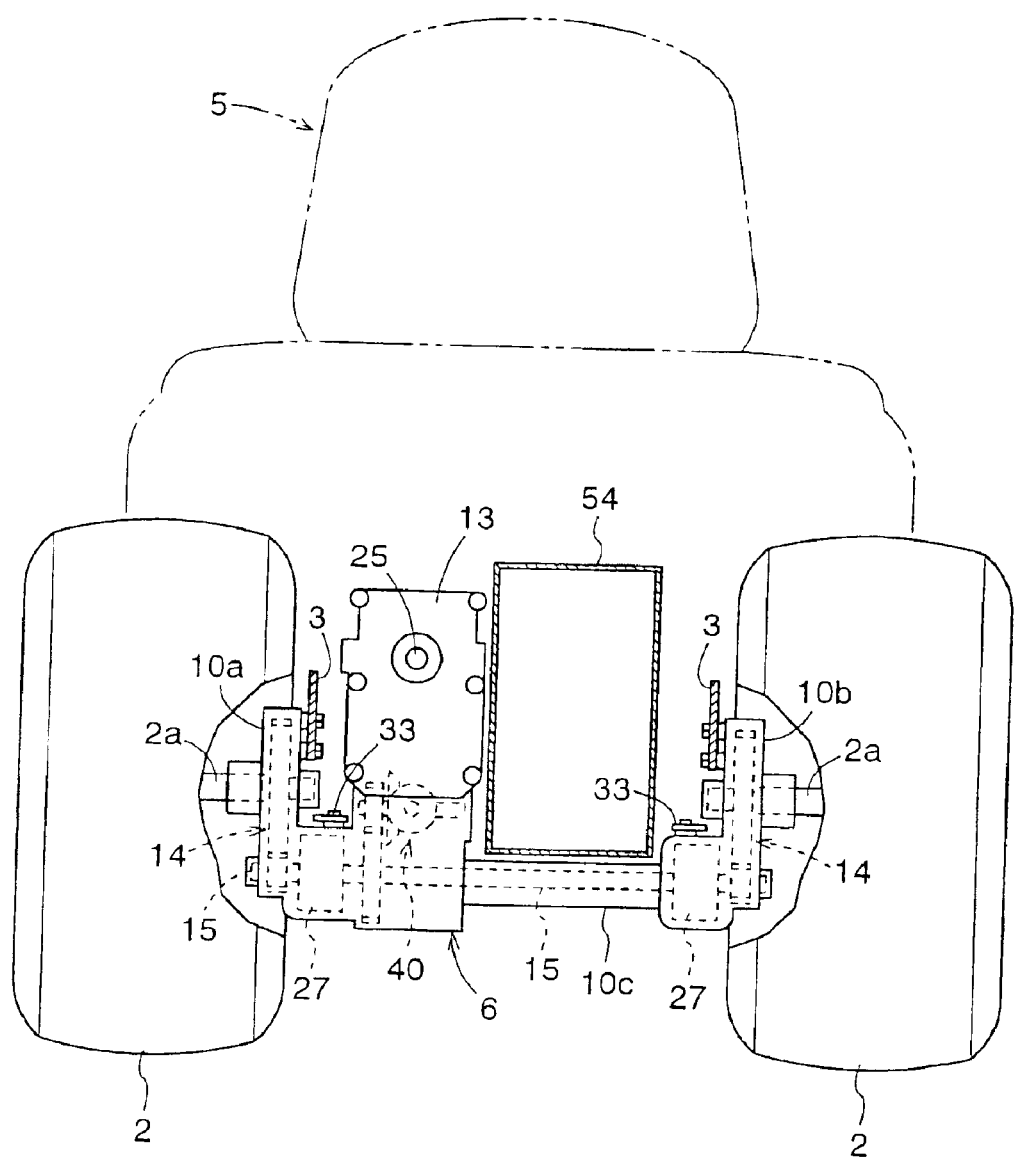
FIG. 4 is rear view, partly in section of a portion of the lawn mower shown in FIG. 1.

As shown in FIG. 4, a left rear wheel transmission case 10a and a right rear wheel transmission case 10b are connected to opposite sides in a lower region of the transmission case 6 for transmitting drive to the rear wheels 2. The left rear wheel transmission case 10a and right rear wheel transmission case 10b are arranged outwardly of the body frame 3 and bolted to the body frame 3. The left and right rear wheel 2 have axles 2a thereof supported by the body frame 3 through the left rear wheel transmission case 10a and right rear wheel transmission case 10b.

In this embodiment, as seen from FIG. 4, the transmission case 6 is offset to the left rear wheel 2. A transverse cylindrical case 10c extends between the transmission case 6 and right rear wheel transmission case 10b. The grass collecting duct 54 extends above the cylindrical case 10c and at a side of the transmission case 6 or, to be precise, the stepless transmission 13 forming part of the transmission case 6.

The body frame 3 is formed of a pair of right and left band-like profile members extending in the fore and aft direction. A large space is formed between the right and left band-like profile members. The change speed device and grass collecting duct 54 may be arranged in this space.

Figure 5:
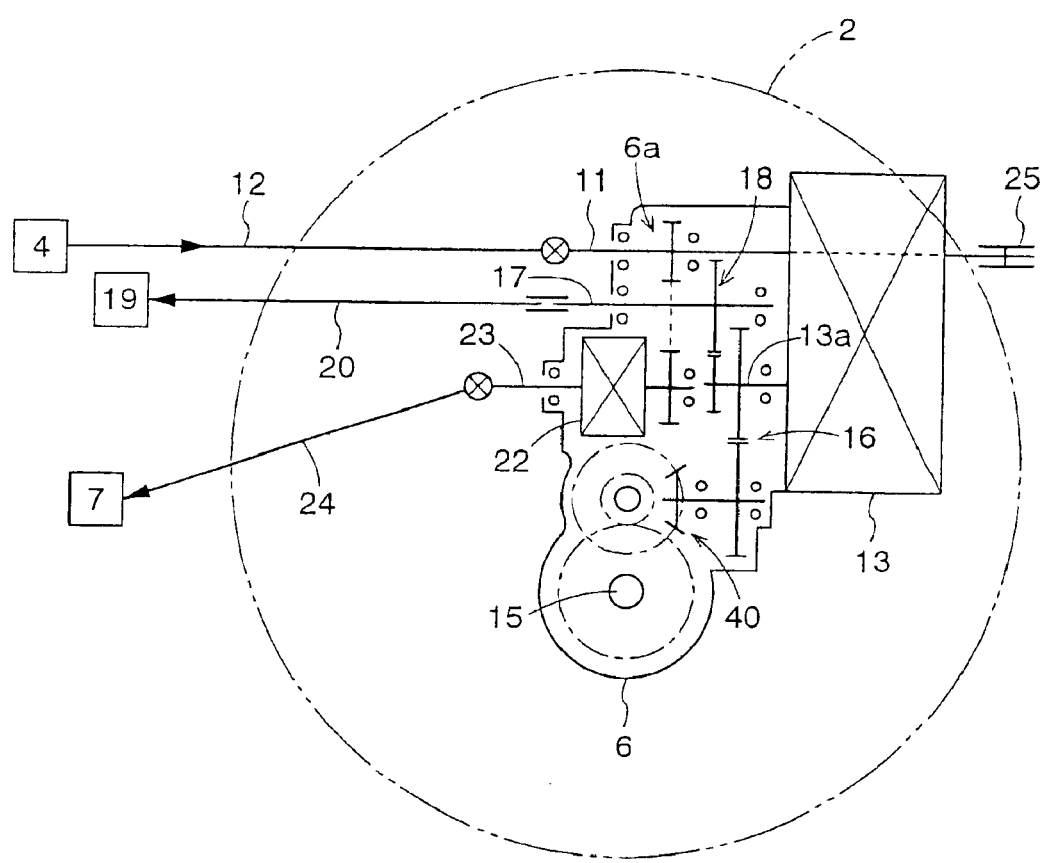
FIG. 5 is a schematic view of a drive transmission system.

The drive transmission system of this lawn mower will be described next. As shown in FIGS. 4 and 5, drive is transmitted from the engine 4 to an input shaft 11 of the transmission case 6 through a transmission shaft 12. This input shaft 11 acts also as an input shaft of the stepless transmission 13 disposed rearwardly of the transmission case 6. Drive inputted to the stepless transmission 13 is subjected to switching in rotating direction (forward rotation and backward rotation) and rotating speed by pedal operation not shown. Drive is transmitted from the stepless transmission 13 through an output shaft 13a to a rear wheel transmission gear set 16, and then to a bevel gear mechanism 40. The bevel gear mechanism 40 is connected at an output end thereof to right and left rear wheel transmission shafts 15 extending transversely from opposite sides of the transmission case 6. The right and left rear wheel transmission shafts 15 are disposed at a lower level than the rear wheel axles 2a. The level difference is absorbed by the rear wheel transmission gear set 16.

The output shaft 13a of the stepless transmission 13 is connected also to a front wheel output shaft 17 by a front wheel transmission gear set 18. The front wheel output shaft 17 is connected to the front wheel differential mechanism 19 through a front wheel intermediate transmission shaft 20.

That is, the front wheel intermediate transmission shaft 20 and front wheel differential mechanism 19 constitute a front wheel driving device for transmitting output of the change speed device including the gear transmission mechanism 6a and stepless transmission 13 to the front wheels 1. The right and left rear wheel transmission shafts 15 and rear wheel transmission gear set 16 constitute a rear wheel driving device for transmitting output of the change speed device to the rear wheels 2.

Further, the transmission case 6 includes a front power takeoff shaft 23 interlocked to the input shaft 11 through a gear set and a working clutch 22. The front power takeoff shaft 23 is connected through a universal joint to a transmission shaft 24 extending to an input shaft 7b of the mower unit 7 for giving drive to the blades 7a of the mower unit 7. The input shaft 11 extends through the stepless transmission 13 to be connected at a rear end thereof to a rear power takeoff shaft 25.

In this embodiment, a rear wheel clutch 27 in the form of a multidisk friction clutch is mounted in an intermediate position of each of the right and left rear wheel transmission shafts 15 forming the rear wheel driving device. The rear wheel clutches 27 are independently operable to connect and disconnect drive transmission from the change speed device to the right and left rear drive wheels 2.

This lawn mower has an interlocking mechanism for reversibly disengaging the rear wheel clutch 27 for the rear drive wheel 2 moving along an inner track of a turn, in response to a steering operation exceeding a predetermined angle from a straight running posture of the front drive wheels 1.

As shown in FIGS. 2 and 3, the interlocking mechanism is in the form of a link mechanism including an interlocking rod 31 connected to one of knuckle arms 30 interlocked through a tie rod 29 of a steering mechanism for steering the front drive wheels 1 in response to turning of a steering wheel 28 disposed on the driving platform 5. The interlocking mechanism further includes a relay link 32 pivotable about a vertical axis in response to movement of the interlocking rod 31, and control rods 34 operatively connecting opposite ends of the relay link 32 to respective control levers 33 of the right and left rear wheel clutches 27. This link mechanism extends over the mower unit 7.

The operative connection between the interlocking rod 31 and knuckle arm 30 includes a slot 35 acting as a play-accommodating device for transmitting a displacement of the knuckle arm 30 to the interlocking rod 31 only when the steering wheel 28 (and thus the knuckle arm 30) is turned in excess of a predetermined angle from a straight running position. The interlocking rod 31 and knuckle arm 30 are connected through a pin inserted in the slot 35.

The operative connection between each of the right and left control rods 34 and each control lever 33 includes a slot 36a that provides lost motion for the interlocking relationship between the control rod 34 and the control lever 33 of the rear wheel clutch 27 when the latter lies outward in time of the mower making a turn. Further, a play-accommodating spring 36b is disposed between the relay link 32 and each of the right and left control rods 34. The spring 36b is elastically deformable for allowing steering of the front drive wheels 1 following disengagement of the rear wheel clutch 27 lying inward in time of the mower making a turn.

With this construction, when the front drive wheels 1 are steered in excess of the predetermined steering angle (i.e. swing angle of knuckle arms 30) from the straight running posture, the control rods 34 of the link mechanism are displaced to swing one of the control levers 33 (the control lever belonging to the rear wheel clutch 27 inward in time of a turn). Consequently, the rear wheel clutch 27 inward in time of a turn is disengaged.

This embodiment includes the play-accommodating device (slot 35) which allows the rear wheel clutches 27 to be inoperative until the steering wheel 28 (and thus the knuckle arm 30) is turned in excess of the predetermined angle from the straight running position. This play-accommodating device may be omitted, so that the interlocking rods 31 are displaced when the steering wheel 28 is turned only a small amount from the straight running position.

Figure 6:
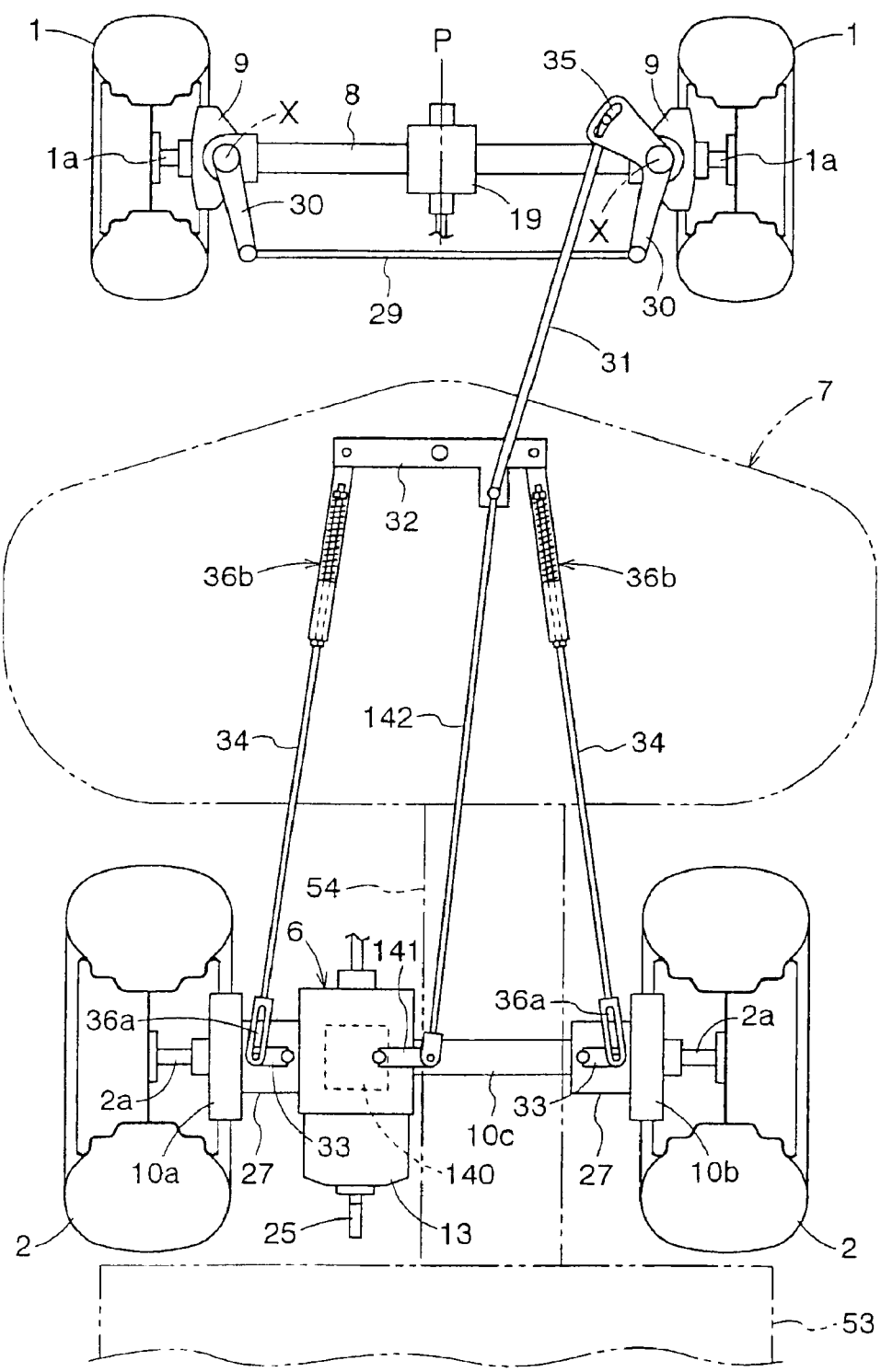
FIG. 6 is a schematic plan view showing a link mechanism of a lawn mower in a second embodiment of this invention.

FIG. 6 shows a lawn mower having selectively drivable wheels in a second embodiment of this invention. This embodiment is different from the foregoing first embodiment in that the front wheels 1 are non-driving type dirigible wheels, and that a rear wheel differential mechanism 140 with a differential lock function is used instead of the bevel gear mechanism 40 for transmitting drive to the right and left rear wheel transmission shafts 15. The interlocking mechanism operates not only the rear wheel clutches 27 but also the rear wheel differential mechanism 140 in response to a displacement of the front wheels 1 from the straight advancement posture to a steering posture.

The structure of the rear wheel differential mechanism 140 with a differential lock function is well known, and will not particularly be described here. A lock lever 141 is swingable to lock the differential mechanism 140, thereby prohibiting its differential operation. Then, the differential mechanism 140 acts like a bevel gear mechanism.

This interlocking mechanism is constructed as a link mechanism as in the first embodiment. Here, the link mechanism further includes a lock control rod 142 for operatively connecting the relay link 32 and lock lever 141.

With this construction, when the front wheels 1 are steered in excess of a predetermined steering angle (i.e. swing angle of knuckle arms 30) from the straight running posture, as in the first embodiment, the control rods 34 of the link mechanism are displaced to swing one of the control levers 33 (the control lever belonging to the rear wheel clutch 27 inward in time of a turn). Consequently, the rear wheel clutch 27 inward in time of a turn is disengaged to break drive transmission to the inward rear drive wheel 2. In this embodiment, the lock control rod 142 also is displaced at the same time to swing the lock lever 141, thereby locking the differential mechanism 140.

When the front wheels 1 are maintained in the straight running posture or steered by an angle not exceeding the predetermined steering angle (swing angle of knuckle arms 30), the rear wheel differential mechanism 140 is in unlocked state to be capable of differential action, and the two rear wheel clutches 27 are engaged.

Figure 7:
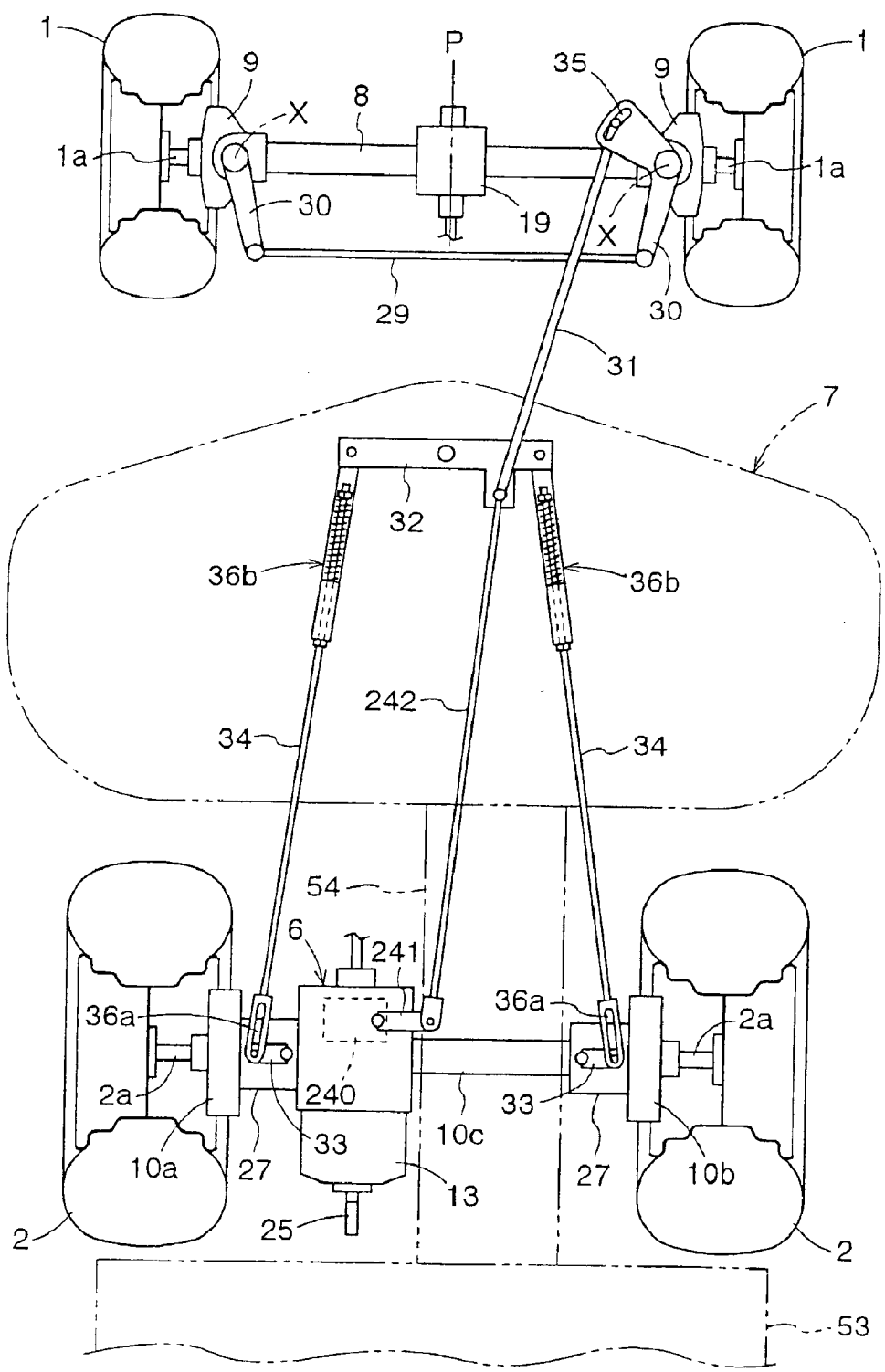
FIG. 7 is a schematic plan view showing a link mechanism of a lawn mower in a third embodiment of this invention.

FIG. 7 shows a lawn mower having selectively drivable wheels in a third embodiment of this invention. This embodiment is different from the foregoing first embodiment in that a rear wheel center clutch 240 is added upstream of the bevel gear mechanism 40 with respect to the drive transmitting direction for selectively connecting and disconnecting the drive from the stepless transmission 13. The interlocking mechanism operates not only the rear wheel clutches 27 but also the rear wheel center clutch 240 in response to a displacement of the front wheels 1 from the straight advancement posture to a steering posture.

This interlocking mechanism is constructed as a link mechanism as in the first embodiment. Here, the link mechanism further includes a control rod 242 for operatively connecting the relay link 32 and a control lever 241 of the rear wheel center clutch 240. This link mechanism maintains the rear wheel center clutch 240 disengaged when the front wheels 1 are steered by a small steering angle, and engaged when the front wheels 1 are steered by a large steering angle.

With this construction, when the front wheels 1 are steered in excess of a predetermined steering angle (i.e. swing angle of knuckle arms 30) from the straight running posture, as in the first embodiment, the control rods 34 of the link mechanism are displaced to swing one of the control levers 33 (the control lever belonging to the rear wheel clutch 27 inward in time of a turn). Consequently, the rear wheel clutch 27 inward in time of a turn is disengaged to break drive transmission to the inward rear drive wheel 2. In this embodiment, the control rod 242 also is displaced at the same time to swing the control lever 241 of the rear wheel center clutch 240, thereby engaging the rear wheel center clutch 240. Since drive is transmitted through the bevel gear mechanism 40 to the right and left rear wheel transmission shafts 15, the rear wheel 2 moving along an outer track of a turn is driven. Thus, the lawn mower makes a turn while driving the front wheels and one of the rear wheels.

When the front wheels 1 are maintained in the straight running posture or steered by an angle not exceeding the predetermined steering angle (swing angle of knuckle arms 30), the control rod 242 is not displaced, thereby maintaining the rear wheel center clutch 240 disengaged. As a result, the lawn mower is propelled only by the front wheels 1 (front wheel drive).

Figure 8:
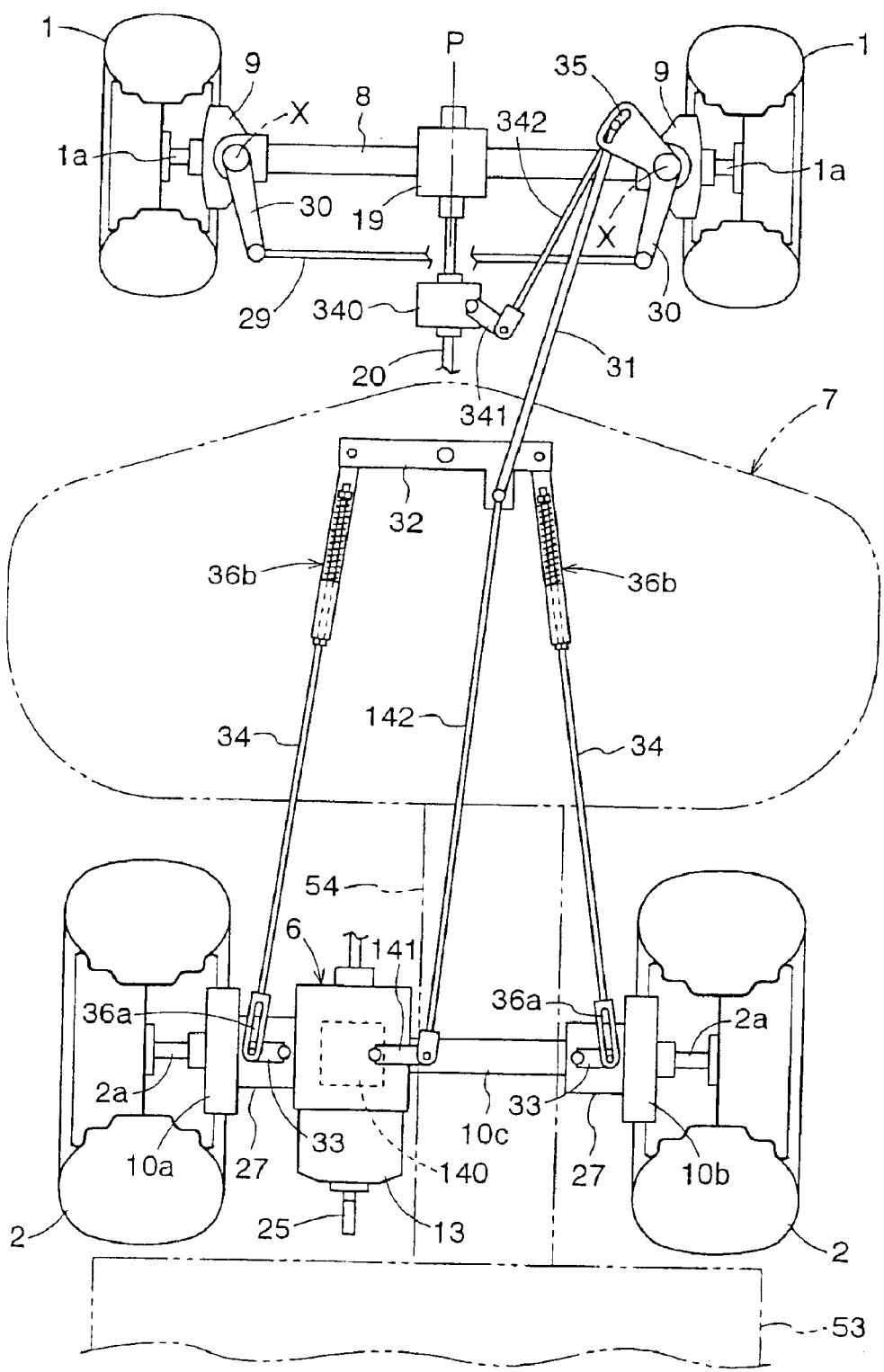
FIG. 8 is a schematic plan view showing a link mechanism of a lawn mower in a fourth embodiment of this invention.

FIG. 8 shows a lawn mower having selectively drivable wheels in a fourth embodiment of this invention. This embodiment is different from the foregoing second embodiment in that the front wheels 1 are driving type dirigible wheels as in the first embodiment, and that a front wheel center clutch 340 is added upstream of the front wheel differential mechanism 19 with respect to the drive transmitting direction for selectively connecting and disconnecting the drive to the front wheels 1. The interlocking mechanism operates the rear wheel clutches 27, rear wheel differential mechanism 140 and front wheel center clutch 340 in response to a displacement of the front wheels 1 from the straight advancement posture to a steering posture. In this connection, as distinct from the second embodiment, this interlocking mechanism includes a control rod 342 connected at one end thereof to the knuckle arm 30 by a pin inserted in the slot 35, and at the other end connected to a control lever 341 of the front wheel center clutch 340.

This link mechanism maintains the front wheel center clutch 340 disengaged when the front wheels 1 are steered by a small steering angle, and engaged when the front wheels 1 are steered by a large steering angle.

With this construction, when the front wheels 1 are steered in excess of a predetermined steering angle (i.e. swing angle of knuckle arms 30) from the straight running posture, as in the first embodiment, the control rods 34 of the link mechanism are displaced to swing one of the control levers 33 (the control lever belonging to the rear wheel clutch 27 inward in time of a turn). Consequently, the rear wheel clutch 27 inward in time of a turn is disengaged to break drive transmission to the inward rear drive wheel 2. The lock control rod 142 also is displaced at the same time to lock the differential mechanism 140. Further, the front wheel center clutch 340 is engaged. That is, the lawn mower makes a turn while driving the front wheels and one of the rear wheels.

When the front wheels 1 are maintained in the straight running posture or steered by an angle not exceeding the predetermined steering angle (swing angle of knuckle arms 30), the rear wheel differential mechanism 140 is in unlocked state to be capable of differential action, and the two rear wheel clutches 27 are engaged. The front wheel center clutch 340 is disengaged. As a result, the lawn mower is propelled only by the right and left rear wheels 2 (rear wheel drive).

What is claimed is:

1. A lawn mower having selectively drivable wheels, comprising:
   dirigible front drive wheels;
   a pair of right and left rear drive wheels;
   a body frame;
   an engine supported by said body frame;
   a mower unit vertically movably supported by said body frame forwardly of said rear drive wheels;
   a change speed device for changing a speed of drive from said engine;
   a front wheel driving device for transmitting drive from said change speed device to said front wheels;
   a left rear wheel driving device for transmitting drive from said change speed device to a right axle of said left rear wheel, and a right rear wheel driving device for transmitting drive from said change speed device to a left axle of said right rear wheel;

rear wheel clutches associated with said left rear wheel driving device and said right rear wheel driving device, respectively, for selectively connecting and disconnecting drive; and an interlocking mechanism for operating said rear wheel clutches in response to a displacement to said front drive wheels from a straight running posture, to disconnect drive transmission to one of said rear drive wheels moving along an inner track when the lawn mower makes a turn, said interlocking mechanism having a link mechanism operatively connecting a steering mechanism for steering said front drive wheels to each of said rear wheel clutches, and extending over said mower unit, wherein said link mechanism comprises a relay link operatively connected with said front wheels and a pair of levers operatively connected to said right rear wheel and said left rear wheel, said relay link coacting with said levers.

2. A lawn mower as defined in claim 1, further comprising a grass catcher disposed in a rear position of said body frame, and a grass collecting duct for transmitting grass clippings cut by said mower unit rearward to said grass catcher, said grass collecting duct being disposed to pass between said right axle and said left axle.

3. A lawn mower as defined in claim 2, wherein said change speed device is disposed laterally said grass collecting duct between said right axle and said left axle.

4. A lawn mower as defined in claim 3, wherein said left rear wheel driving device extends from said change speed device to said left axle through a region at a lower level than said change speed device and said grass collecting duct, and said right rear wheel driving device extends from said change speed device to said right axle through a region at a lower level than said change speed device and said grass collecting duct.

5. A lawn mower as defined in claim 3, wherein said body frame is formed of a pair of right and left band-like profile members extending in a fore and aft direction, said change speed device and said grass collecting duct being arranged between said right and left band-like profile members.

6. A lawn mower as defined in claim 1, wherein said link mechanism is connected to said rear wheel clutches at a lower level than said axles.

7. A lawn mower as defined in claim 1, further comprising a rod for coacting said relay link with one of said levers.

8. A lawn mower as defined in claim 7, further comprising a second rod for coacting said relay link with the other of said levers.

* * * * *